UNITED STATES PATENT OFFICE.

THEODORE L. CORWIN, OF MARATHON, NEW YORK.

COMPOUND FOR PRESERVING FOOD.

SPECIFICATION forming part of Letters Patent No. 253,983, dated February 21, 1882.

Application filed January 9, 1882. (Specimens.)

*To all whom it may concern:*

Be it known that I, THEODORE L. CORWIN, of the village of Marathon, county of Cortland, and State of New York, have invented a new and improved combination of material for preserving and preventing putrefaction and decay in perishable substances.

The invention relates to the class of compounds used to preserve in a healthy state such articles of food as meats, fish, milk, eggs, butter, oysters, cider, and also to be used as a disinfectant and to arrest putrefaction. I do hereby declare that the following is a full and exact description of the said invention.

I take of nitrate of potassium, of salicylic acid, and of chloride of sodium each one ounce. These should be all in powder. Dissolve these in one quart of boiling water. Then add one dram of hydrochloric acid previously diluted with one ounce of water. Then, to preserve meat, immerse it for twenty minutes in the hot solution, after which let it drain for one hour. Then pack in a well-closed vessel. For the preservation of fish, use the same as for meat, only the solution should be allowed to become cold before using. To keep oysters, stir into them three ounces of the above solution (cold) to each gallon of oysters.

Cider will be kept sweet if there is added to each barrel one quart of the solution previously named immediately after the cider comes from the press.

Milk, to be kept sweet, should have the powder first named—viz., nitrate of potassium, salicylic acid, and chloride of sodium, of each one ounce—added to every sixteen gallons.

As a disinfectant, the solution should be sprinkled freely around the place or places to be disinfected.

To arrest putrefaction the solution should be copiously applied to the object treated.

This, in brief, explains my invention and discovery and my manner of using it.

I am aware that salicylic acid, chloride of sodium, and nitrate of potassium, with sugar, have been used in combination for preservative purposes.

I am also aware that in English Patent No. 2,568 of 1870 hydrochloric acid is stated to be a general preservative, but I am not aware that the combination used by me has ever been used prior to my invention.

Having thus described my invention, what I claim as new, and desire to secure by Letters Patent, is—

The above-described combination or compound of nitrate of potassium, salicylic acid, chloride of sodium, hydrochloric acid, and water in the proportions before stated, for the use and purpose herein set forth.

In witness whereof I have hereunto set my hand, at the city of Washington, D. C., United States of America, this 7th day of January, A. D. 1882.

THEODORE L. CORWIN.

Witnesses:
S. S. BRITTON,
W. H. CROSBY.